United States Patent [19]

Greenlee et al.

[11] Patent Number: 5,153,269

[45] Date of Patent: Oct. 6, 1992

[54] THERMOPLASTIC ELASTOMER BLENDS OF A POLYVINYL CHLORIDE-ACRYLATE COPOLYMER AND A CURED ACRYLATE ELASTOMER

[75] Inventors: William S. Greenlee; Josef C. Vyvoda; Fred R. Wolf, all of Avon Lake, Ohio

[73] Assignee: The B. F. Goodrich Company, Brecksville, Ohio

[21] Appl. No.: 620,677

[22] Filed: Dec. 3, 1990

[51] Int. Cl.$^5$ .............................................. C08L 33/06
[52] U.S. Cl. .................................................. 525/228
[58] Field of Search ........................................ 525/228

[56] References Cited

U.S. PATENT DOCUMENTS

| | | |
|---|---|---|
| 3,595,819 | 7/1971 | Dakli et al. |
| 4,272,424 | 6/1981 | Kitamura et al. ................ 525/228 |
| 4,380,606 | 4/1983 | Coran et al. ..................... 525/221 |
| 4,935,468 | 6/1990 | Greenlee et al. ................ 525/228 |

Primary Examiner—Paul R. Michl
Assistant Examiner—Olga Asinovsky
Attorney, Agent, or Firm—Joe A. Powell

[57] ABSTRACT

Thermoplastic elastomer blends containing polyvinyl chloride having improved oil resistance, exceptionally low compression set and softness are made by mixing a polyvinyl chloride-acrylate copolymer with effective amounts of cured acrylate elastomers. The polyvinyl chloride-acrylate copolymer has an inherent viscosity of from about 0.3 to about 4.0 and is made from a vinyl constituent which is a vinyl chloride monomer with an optional vinyl component comonomer and one or more acrylate monomers having the formula

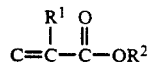

FORMULA I wherein $R^1$ is an aliphatic, an aromatic, or combinations thereof, having from 1 to 18 carbon atoms, or a halogen derivative thereof, or hydrogen, and $R^2$ is an aliphatic, an aromatic, an alkyl hydroxyl, or combinations thereof, having from 1 to 18 carbon atoms, or a halogen derivative thereof; or a hydrocarbyl ether such as an alkoxyalkyl, a phenoxyaryl, a phenoxyalkyl, or combinations thereof, having from 2 to 1,000 carbon atoms, or a substituted halogen, oxygen, sulfur, or nitrogen derivative thereof, and wherein the acrylate elastomer is made from one or more acrylate monomers having the formula

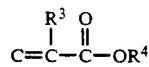

FORMULA II wherein $R^3$ is an aliphatic, an aromatic, or combinations thereof, having from 1 to 18 carbon atoms, or a halogen derivative thereof, or hydrogen, and $R^4$ is an aliphatic, an aromatic, an alkyl hydroxyl, or combinations thereof, having from 1 to 18 carbon atoms, or a halogen derivative thereof; or a hydrocarbyl ether such as an alkoxyalkyl, a phenoxyaryl, a phenoxyalkyl, or combinations thereof having from 2 to 1,000 carbon atoms, or a substituted halogen, oxygen, sulfur, or nitrogen derivative thereof.

3 Claims, No Drawings

THERMOPLASTIC ELASTOMER BLENDS OF A POLYVINYL CHLORIDE-ACRYLATE COPOLYMER AND A CURED ACRYLATE ELASTOMER

FIELD OF THE INVENTION

The present invention relates to thermoplastic elastomer blends of a polyvinyl chloride-acrylate copolymer and a cured acrylate elastomer. The acrylate elastomer can be precrosslinked before blending, or can be crosslinked in situ when blended with the copolymer, or can be crosslinked after blending. The blends have exceptional softness, very low compression set, good high temperature deformation resistance, improved oil resistance, and low temperature flexibility.

BACKGROUND

U.S. Pat. No. 4,380,606 to Coran and Patel relates to a thermoplastic composition containing a blend of neutralized acrylic-olefin copolymer, and a polyvinyl chloride.

SUMMARY OF THE INVENTION

The blends of the present invention containing polyvinyl chloride therein have several favorable properties including good oil resistance, high temperature heat deformation resistance, good low temperature flexibility, and very low compression set. The blend, which is a thermoplastic elastomer, is also very soft and thus exhibits plasticized properties and has no bleeding out of any material. The blend contains a copolymer made by the polymerization of vinyl chloride monomers with optional vinyl chloride component comonomers and one or more acrylate monomers. The blend also contains an acrylate elastomer which generally has a very high weight average molecular weight, as for example at least 100,000, and can be a homopolymer or a copolymer. The acrylate elastomer generally contains reactive or functional groups therein such as halogen and/or carboxyl groups which permit the acrylate elastomer to be crosslinked. Cure can occur after blending with the acrylate elastomer or in situ as when the acrylate elastomer is blended with the polyvinyl chloride-acrylate copolymer or it can be precured and subsequently blended with the polyvinyl chloride-acrylate copolymer.

DETAILED DESCRIPTION OF THE INVENTION

The thermoplastic elastomer blends of the present invention contain polyvinyl chloride generally in the form of a copolymer. The copolymer is a polyvinyl chloride-acrylate copolymer made from (a) a vinyl chloride constituent, that is, a vinyl chloride monomer and an optional vinyl component comonomer and (b) one or more acrylate monomers. The amount of vinyl chloride monomer and optional vinyl component comonomer utilized to make the polyvinyl chloride-acrylate copolymer is a sufficient amount so that the polyvinyl chloride-acrylate copolymer generally contains from about 10 parts to about 90 parts by weight, desirably from about 25 parts to about 80 parts by weight and preferably from about 40 parts to about 60 parts by weight of vinyl chloride and/or optional vinyl component units therein for every 100 parts by weight of the copolymer. Thus, the amount of the acrylate units in the copolymer is generally from about 90 parts to about 10 parts by weight, desirably from about 75 to about 20 parts by weight, and preferably from about 60 to about 40 parts by weight. The amount of the optional vinyl component units in the copolymer is from about 0 to about 45 parts by weight with from about 0 to about 20 parts by weight being preferred. In other words, the vinyl chloride constituent can contain up to 50 percent thereof and preferably up to 22 percent thereof by weight of the vinyl component unit. By the term "vinyl component", it is meant a vinyl unit other than vinyl chloride. Such units are well known to the art and to the literature and are derived from vinyl esters wherein the ester portion contains from 1 to 18 carbon atoms such as vinyl acetate; vinylidene chloride; 1,2-dichloroethylene; styrene and styrene derivatives having a total of from 8 to 15 carbon atoms such as alphamethylstyrene, vinyl toluene, chlorostyrene, chloromethylstyrene; vinyl naphthalene; diolefins having a total of from 4 to 18 carbon atoms such as butadiene, isoprene, including halogenated diolefins such as chloroprene; monoolefins having a total of from 2 to 18 carbon atoms and preferably 2 to 4 carbon atoms; and the like. Vinyl acetate is a preferred vinyl component comonomer which, upon polymerization, becomes a vinyl component unit.

The one or more acrylate units contained in the polyvinyl chloride-acrylate copolymer has the formula, before polymerization,

FORMULA I wherein $R^1$ is an aromatic, an aliphatic (especially an alkyl), or combinations thereof, having from 1 to 18 carbon atoms, or a halogen derivative thereof, desirably is methyl, and preferably is hydrogen. $R^2$ is an aliphatic group, especially an alkyl, an aromatic, an alkyl hydroxyl, or combinations thereof, having from 1 to 18 carbon atoms, desirably from 2 to 10 carbon atoms, and preferably from 2 to 8 carbon atoms, or a halogen derivative thereof; or $R^2$ is a hydrocarbyl ether such as alkoxyalkyl, a phenoxyaryl, or a phenoxyalkyl, or combinations thereof having from 2 to 1,000 carbon atoms, desirably from 2 to 18 carbon atoms, and preferably from 2 to 8 carbon atoms, or a substituted halogen, oxygen, nitrogen, or sulfur derivative thereof. Examples of specific acrylate monomers include ethyl acrylate, propyl acrylate, butyl acrylate, hexyl acrylate, octyl acrylate, 2-ethyl hexyl acrylate, nonyl acrylate, decyl acrylate, phenyl acrylate, nonylphenyl acrylate, ethyl methacrylate, butyl methacrylate, hexyl methacrylate, 2-ethyl hexyl methacrylate, methoxymethyl acrylate, methoxyethyl acrylate, ethoxyethyl acrylate, butoxyethyl acrylate, ethoxypropyl acrylate, 2(2-ethoxyethoxy)ethyl acrylate, and the like. Especially preferred acrylate monomers include butyl acrylate, 2-ethyl hexyl acrylate, ethyl acrylate, and the like. As noted hereinabove, the $R^2$ group can be a hydrocarbyl ether group. That is, it can be an ether, a diether, or a multiple ether of an alkyl, an aryl, or combinations thereof, such as an alkoxyalkyl, a phenoxyaryl, a phenoxyalkyl, and the like, generally having from 2 to 1,000 carbon atoms, desirably from 2 to 18 carbon atoms, and preferably from 2 to 8 carbon atoms, or combinations thereof. Examples of specific alkoxyalkyl acrylates include methoxymethyl acrylate, butoxyethyl acrylate; ethoxypropyl acrylate, methoxyethyl acrylate, ethoxyethyl acrylate, 2(2-ethoxyethoxy)ethylacrylate, and the like. Examples of specific phenoxyalkyl acrylates include 2-phenoxylethyacrylate and 2-phenoxyethylmethacrylate. In addition to the above $R^2$ ether groups, halogen, oxygen, nitrogen, or sulfur derivatives of such hydrocarbyl ether groups can also be utilized. For examples $R^2$ can be an alkoxyalkyl containing at least one halogen therein in lieu of a hydrogen atom.

The molecular weight of the polyvinyl chloride-acrylate copolymer is measured in terms of inherent viscosity and is from about 0.3 to about 4.0, desirably from about 0.8 to about 2.0, and preferably from about 1.0 to about 1.5. The inherent viscosity is measured utilized cyclohexanone as the solvent. The copolymer is dissolved in the solvent at 90° C. for 90 minutes and then measured with a viscometer in a water bath at 30° C.

The polyvinyl chloride-acrylate copolymer can be polymerized from the above-noted monomers in any conventional manner such as emulsion, mass, solution, and the like with suspension being preferred. Generally, polymerization is initiated with a free radical initiator such an alkanoyl, aroyl, alkaroyl, or an aralkanoyl diperoxide, a monohydroperoxide, or an azo compound, a peroxy ester, a percarbonate or any other suitable free radical-type initiator. Examples of specific initiators include benzoyl peroxide, laurayl peroxide, diacetyl peroxide, cumene hydroperoxides, methyl ethyl ketone peroxide, diisopropylbenzene hydroperoxide, 2,4-dichlorobenzoyl peroxide, naphthoyl peroxide, t-butyl perbenzoate, di-t-butyl perphthalate, isopropyl percarbonate, acetyl cyclohexane sulfonyl peroxide, disecondary butyl peroxydicarbonate, t-butyl peroxyneodecanoate, dinormal propyl peroxydicarbonate, azobisisobutyronitrile, alpha, alpha'-azodiisobutyrate, 2,2'-azo-bis-(2,4-dimethyl valeronitrile), and the like; Polymerization can be carried out at suitable temperatures with temperatures of from about 10° to 85° C. being desired and from about 40° to about 65° C. being preferred. The amount of the initiator utilized is generally quite small as from about 0.005 parts by weight to about 1.0 parts by weight and preferably from about 0.01 to about 0.1 parts by weight for every 100 parts by weight of the total monomers being copolymerized.

The utilization of a cured acrylate elastomer blended with the above copolymer has been found to impart unexpected good physical properties such as low compression set, high temperature heat deformation resistance, good oil resistance, and yield a soft plastic. In effect, the acrylate elastomer acts as a plasticizer in that it softens the system and yet does not bleed out and hence does not result in shrinkage of the polymer following immersion in hot oil. Rather, the polymer will actually swell. One or more acrylate monomers can be utilized in forming the acrylate elastomer. Such monomers have the formula

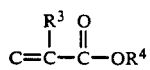

FORMULA II wherein $R^3$ is an aromatic, an aliphatic (especially an alkyl), or combinations thereof, having from 1 to 18 carbon atoms, or a halogen derivative thereof, desirably is methyl, and preferably is hydrogen. The $R^4$ group is an aliphatic, especially an alkyl group, an aromatic, an alkyl hydroxyl, or combinations thereof, having from 1 to 18 carbon atoms, desirably from 2 to 10 carbon atoms, and preferably from 2 to 8 carbon atoms, or a halogen derivative thereof; or $R^4$ is a hydrocarbyl ether such as alkoxyalkyl, a phenoxyaryl, or a phenoxyalkyl, or combinations thereof, having from 2 to 1,000 carbon atoms, desirably from 2 to 18 carbon atoms, and preferably from 2 to 8 carbon atoms, or a substituted halogen, oxygen, nitrogen, or sulfur derivative thereof. Examples of specific acrylate monomers include ethyl acrylate, propyl acrylate, butyl acrylate, hexyl acrylate, octyl acrylate, 2-ethyl hexyl acrylate, ethyl methacrylate, butyl methacrylate, hexyl acrylate, and the like. Often, as noted, two or more acrylate monomers are utilized such as ethyl acrylate and butyl acrylate, butyl acrylate and 2-ethyl hexyl acrylate, ethyl acrylate and 2-ethyl hexyl acrylate, and the like. Generally the amount of any one acrylate monomer to the remaining acrylate monomers forming the acrylate elastomer can range from about 0.1 percent to about 99.9 percent by weight. Examples of specific alkoxyalkyl acrylates include methoxymethyl acrylate, butoxyethyl acrylate; ethoxypropyl acrylate; methoxyethyl acrylate, ethoxyethyl acrylate, 2(2-ethoxyethoxy)ethylacrylate, and the like. Examples of specific phenoxyalkyl compounds include 2-phenoxylethyacrylate and 2-phenoxyethylmethacrylate. In addition to the above $R^4$ ether groups, halogen, oxygen, nitrogen, or sulfur derivatives of such hydrocarbyl ether groups can also be utilized. The amount of the hydrocarbyl ether acrylate monomer utilized in forming the acrylate elastomer is generally from about 0.1 to about 60 percent by weight and preferably from about 10 to about 50 percent by weight based upon the total weight of the acrylate elastomer Formula II type monomers. A preferred acrylate elastomer is made from about 20 to about 60 percent by weight of methoxy ethyl acrylate, from about 20 to about 40 percent by weight of ethyl acrylate, and from about 20 to about 40 percent by weight of butyl acrylate. Another preferred acrylate elastomer is made from about 40 percent to about 60 percent by weight of methoxyethyl acrylate and from about 40 to about 60 percent by weight of butyl acrylate. Still another preferred acrylate elastomer is made from about 70 to about 90 percent by weight of butyl acrylate monomers and from about 10 percent to about 30 percent by weight of ethyl acrylate monomers. Yet another preferred system contains from about 80 to about 100 percent by weight of ethyl acrylate monomers and from about 0 to about 20 percent by weight of butyl acrylate monomers.

During the polymerization of the acrylate elastomer, a small amount of reactive or functional groups are added to the polymer so that it can be cross-linked. Such functional groups are well known to the art and to the literature and include various halogens such as chloro groups and/or carboxyl groups that are derived from various monomers. Examples of halogen-containing monomers include vinyl chloroacetate, allyl chloroacetate, 2-chloroethyl acrylate, 2-chloroethyl vinyl ether, vinyl benzyl chloride, 5-chloromethyl-2-norbornene, 5-chloroacetoxymethyl-2-norbornene, and the like. Examples of suitable carboxyl-containing monomers are the various monocarboxylic or polycarboxylic monomers containing from 3 to 8 carbon atoms such as acrylic acid, methacrylic acid, itaconic acid, and the like. The amount of such functional containing monomers is from about 0.1 to about 10 parts by weight and preferably from about 0.5 to about 5 parts by weight for every 100 parts by weight of the acrylate elastomer forming monomers.

The various acrylate elastomers can generally be prepared in any conventional manner such as suspension, emulsion, solution, bulk, and the like, with free radical emulsion polymerization being preferred. Various conventional soaps, emulsifiers, and surfactants, known to the art and to the literature can be utilized in forming the acrylate elastomer. Specific examples of free radical initiators include organic peroxides and hydroperoxides such as benzoyl peroxide, dicumyl peroxide, cumene hydroperoxide, and the like, used alone or with redox systems; diazo compounds such as azobisisobutyronitrile, and the like; persulfate salts such as sodium, potassium, and ammonium persulfate, used alone or with redox systems. Polymerization temperature is generally from about −10° to about 100° C. with from about 5° about 80° C. being preferred. Once the polymer has been formed, it can be recovered by any conventional method such as coagulation and the like. The weight average molecular weight of the acrylate elastomer is generally quite high, that is generally in excess of 100,000.

The polyvinyl chloride-acrylate copolymer desirably is not crosslinked so that it has good processing properties. However, it is to be understood that it is within the ambit of the present invention to either partially crosslink or crosslink the polyvinyl chlorideacrylate copolymer to provide improved physical properties. Should the polyvinyl chloride-acrylate copolymer be crosslinked or cured, any conventional crosslinking agent can be utilized such as diallyl phthalate, various diacrylates such as butanediol diacrylate, diethylene glycol diacrylate, and the like. The acrylate elastomer is generally cured, that is an amount of crosslinking agent is utilized such that an increase and preferably a significant increase in the modulus of the acrylate elastomer will occur. According to the concepts of the present invention, the acrylate elastomer can either be pre-cured, that is cured before blending with the polyvinyl chloride-acrylate copolymer, or cured either when blending therewith or after blending. Desirably the product is cured before blending or cured while blending. However, it is to be understood that it is within the ambit of the present invention that the acrylate elastomer can be cured after blending of the acrylate elastomer with the polyvinyl chloride-acrylate copolymer. However, precure, or in situ cure while blending in the acrylate elastomer, is preferred.

Suitable crosslinking agents are well known to the art and to the literature and include various quaternary ammonium salts, various phosphonium compounds, and the like, either in a one-part system or in a two-part system, such as those set forth in U. S. Pat. No. 3,875,092, to Morris, which is hereby fully incorporated by reference. The total amount of the crosslinking agent generally utilized is from about 0.1 to about 30 parts by weight and preferably from about 1 to about 10 parts by weight for every 100 parts by weight of the acrylate elastomer forming monomers.

When the acrylate elastomer is crosslinked prior to blending with the polyvinyl chloride-acrylate copolymer, crosslinking is carried out by adding the above-noted amount of crosslinking agent to the acrylate elastomer and curing the same as at a temperature of from about 85° to about 230° C. and preferably from about 150° to about 204° C. Once the acrylate elastomer has been crosslinked, it is subsequently blended with the polyvinyl chloride-acrylate copolymer. The amount of the precrosslinked acrylate elastomer utilized is from about 1 to about 400 parts by weight, desirably from about 50 to about 300 parts by weight, and preferably from about 75 to about 200 parts by weight for every 100 parts by weight of the polyvinyl chloride-acrylate copolymer. In order that the crosslinked or cured acrylate elastomer can be readily blended in the copolymer in order to provide improved properties, it is usually ground to a suitable size as from about 1 micron to about 20,000 microns, desirably from about 1 micron to about 10,000 microns, and preferably from about 1 micron to about 1,000 microns. Any suitable or conventional grinding or cyrogenic grinding apparatus can be utilized. Blending can occur utilizing any conventional mixing device in which some shear or mechanical mixing occurs as for example, an extruder, a two-roll mill, a banbury, and the like. The blending operation occurs at a temperature of from about ambient, that is from about 20° C. to about 230° C., desirably from about 35° C. to about 205° C., and preferably from about 120° C. to about 175° C. Mixing generally continues until a relatively thoroughly dispersed blend is obtained. A true physical thermoplastic elastomer blend is achieved since the crosslinked acrylate elastomer is dispersed throughout the polyvinyl chloride-acrylate copolymer.

An alternative blending technique or system involves adding the uncrosslinked or uncured acrylate elastomer to the polyvinyl chloride-acrylate copolymer and blending it therewith and at the same time, i.e., simultaneously (in situ), cure the acrylate elastomer. The amount and type of crosslinking agents utilized are the same as set forth hereinabove with regard to the pre-crosslinked technique and accordingly are hereby incorporated. Any suitable mixing device can be utilized such as a two-roll mill, a banbury, an extruder, and the like. The blending as well as curing temperature of the in situ technique is ambient, that is from about 20° C. to about 230° C. Inasmuch as cure occurs generally in excess of 85° C., desirable in situ mixing and curing temperatures are from about 85° C. to about 230° C. and preferably from about 150° C. to about 204° C. Generally, high shear mixers are preferred because they better reduce the size of the elastomer domains and yield better surface appearance of the final thermoplastic elastomer blend. The amount of acrylate elastomer blended with the polyvinyl chlorideacrylate copolymer according to the in situ cure method is generally from about 1 to about 300 parts by weight, desirably from about 50 to about 200 parts by weight, and preferably from about 60 to about 140 parts by weight for every 100 parts by weight of the polyvinyl chlorideacrylate copolymer. Blending is continued until the acrylate elastomer is generally cured and dispersed throughout the copolymer.

Still another alternative blending technique or system involves blending and mixing the uncrosslinked or un-cured acrylate elastomer with the polyvinyl chlorideacrylate copolymer and blending the same and subsequently, that is later, curing the acrylate elastomer. The amount of the acrylate elastomer utilized in this post cure system is the same as the in-situ system. The mixing temperature of the blending can occur from about ambient to below the curing temperature of the acrylate elastomer such as to about 85° C. Cure occurs at a temperature of from about 85° to about 230° C., with from about 150° to about 204° C. being preferred. Generally, high shear mixers are utilized and the amount of the acrylate elastomer is the same as set forth hereinabove with regard to the in-situ cure system.

Various conventional additives in conventional amounts can be utilized in the blends of the present invention. Thus, various heat stabilizers such as barium/cadmium compounds, lead compounds, and organotin compounds, various conventional lubricants generally utilized with polyvinyl chloride polymers such as paraffin, polyethylene, stearic acid, various processing aids such as polyacrylates, various antioxidants such as BHT, that is butylated hydroxy toluene, BHA, that is butylated hydroxy anisole, and various hindered phenols, various UV inhibitors such as substituted benzophenones, and the like, can be utilized. Moreover, plasticizers, such as those typically used to plasticize polyvinyl chloride and known to one skilled in the art, for example dioctyl phthalate, dioctyl adipate, etc., can also be utilized. Generally, if a plasticizer is utilized, it is utilized in a small amount since the acrylate elastomer as well as the acrylate portion of the polyvinyl chloride/acrylate copolymer act as plasticizing agents.

Various fillers and pigments can also be utilized in conventional amounts such as up to about 200 or 300 parts by weight for every 100 parts by weight of the polyvinyl chloride-acrylate copolymer. Examples of fillers include calcium carbonate, clay, silica, the various silicates, talc, carbon black, and the like. Such fillers are generally added in high amounts as from about 10 to about 200 parts by weight for every 100 parts by weight of the polyvinyl chloride-acrylate copolymer. Examples of various pigments include titanium dioxide, carbon black, and the like. Generally, the amount of such pigments is not as large as the amounts of the fillers.

The various additives, fillers, pigments, and the like in the precured acrylate elastomer system are generally added to the mixer with the acrylate elastomer. In the in situ blending operation, such additives are generally added with the acrylate elastomer and dispersed within the thermoplastic elastomer system during cure and blending of the acrylate elastomer.

Regardless of the particular blending technique or operation utilized, an important processing advantage of the present invention is that the various components can be processed on conventional elastomer equipment as well as conventional thermoplastic equipment. Examples of conventional elastomer equipment include mills, mixers, and extruders designed for the processing of elastomers. Such equipment is generally heated and/or cooled. The extruders generally have a length/diameter ratio of 20 or less.

The thermoplastic elastomer blends of the present invention in comparison with monomerically plasticized polyvinyl chloride of the same hardness have several improved properties such as improved oil resistance which tends to increase as larger amounts of the acrylate elastomer are utilized. Another property is high temperature heat deformation resistance. That is, the blends of the present invention can withstand higher temperatures without being deformed as much as conventional polyvinyl chloride. Low temperature flexibility is also improved. A notable and significant unexpected result achieved by blends of the present invention is low compression set, that is good recovery. The term "compression set" is defined as set forth in ASTM specification D-395, Method B.

Blends of the present invention containing at least 40 parts, desirably at least 50 parts by weight, and preferably at least 60 parts by weight of acrylate elastomer therein based upon 100 parts by weight of the polyvinyl chloride-acrylate copolymer have a compression set of 40 percent or less, and preferably 30 percent or less when measured after heating at 100° C. for 22 hours. Another notable improved property of the present invention is the achievement of a very soft plastic. That is, thermoplastic elastomer blends containing acrylate elastomer in an amount of at least 50 parts and preferably at least 100 parts by weight based upon 100 parts by weight of the polyvinyl chloride-acrylate copolymer wherein the acrylate portion is greater than 40 percent by weight, generally have a Shore A hardness of 50 or less, and preferably 40 or less.

The thermoplastic elastomer blends of the present invention can be utilized wherever such properties are desired such as for example in injection molding, extrusion, thermoforming, compression molding, calendering, and the like, with specific applications including gaskets, seals, weatherstripping, sporting equipment, hoses, tubing, automobile bumpers, and the like.

The invention will be better understood by reference to the following examples.

EXAMPLE 1

Procedure of Vinyl Chloride Monomers/2-ethylhexyl Acrylate Polymerization

The polymerization vessel was charged with the following ingredients:

| | |
|---|---|
| Water | 2223 kg. |
| Vinylchloride monomer | 889 kg. |
| 2-ethylhexyl acrylate | 593 kg. |
| Polyvinyl alcohol dispersants | 28.2 kg. |
| Substituted cellulose dispersant | 22.7 kg. |
| Initiator | 0.445 kg. |

The vessel was charged with water and the dispersants first. After evacuation, the mixture of monomers was added and after the mixing of the contents, the temperature was adjusted to 55° C. Lastly, the initiator was added and the reaction started. The polymerization was carried out for 420 minutes after which time the reactor was cooled to room temperature. The polymer was transferred to a stripping vessel to remove unreacted monomers. After the stripping, the polymer was recovered by filtration and dried.

EXAMPLE 2

A crosslinked acrylate elastomer was prepared by blending a commercial acrylate elastomer (Polymer A) with a curative system consisting of sodium stearate (4 parts by weight per 100 parts of elastomer) and cetyl trimethyl ammonium bromide (1 part by weight per 100 parts of elastomer) in a laboratory size Banbury mixer. The mixture was mixed in the Banbury for eight minutes and dropped. The stock temperature was 254° F. and the material had a crumb-like consistency coming out of the Banbury. This product was cryogenically ground through a ⅜ inch screen and coated with 6 percent magnesium silicate.

The ground crosslinked acrylate elastomer was blended with a copolymer of vinyl chloride and 2-ethylhexyl acrylate which had been prepared in a manner similar to Example 1. The polyvinyl chloride/2-ethylhexyl acrylate copolymer thus formed contained approximately 56 percent polyvinyl chloride and 44 percent 2-ethylhexyl acrylate based on chlorine analysis of a similarly prepared resin.

The ground crosslinked acrylate elastomer and the polyvinyl chloride/2-ethylhexyl acrylate copolymer plus other compound ingredients were blended in a laboratory (BR size) Banbury and then milled on a 6"×16" unheated mill for two minutes after banding and removed as a sheet from the mill. The milled sheet was cut both into approximately 1" wide strips and 6"×6" plaques. The 6"×6" plaques were compression molded using a two minute preheat and a three minute press time at 320° F. These molded sheets were then used to determine the physical properties as given in Table I. The 1" wide strips were extruded on an extruder designed to process elastomeric materials. The extruder has an approximate 7:1 length/diameter ratio (deep-flighted screw) and is heated by circulating hot water. The samples were extruded using a Garvey die and surface appearance was measured and is reported in Table I.

This example illustrates that blends of a ground crosslinked acrylate elastomer with a polyvinyl chloride/2-ethylhexyl acrylate copolymer will produce a product with improved compression set resistance, oil resistance, high temperature deformation properties, low temperature flexibility and lower hardness. These blends are also extrudable on equipment designed for processing elastomers.

EXAMPLE 3

The polyvinyl chloride/2-ethylhexyl acrylate copolymer of Example 1 plus other compounding ingredients were blended with a series of uncured acrylate elastomers (Polymer A, Polymer B, Polymer C) and a curative system in a laboratory Banbury (BR size) mixer. The mixture was dropped from the Banbury mixer at approximately 300°-350° F. and then placed on a 6"×16" unheated mill and formed into a sheet. The milled sheet was cut into both 1" wide strips and 6"×6" plaques. The 1" wide strips were extruded on an extruder designed for processing elastomer materials. The extruder contained an approximately 7:1 length/diameter deep-flighted screw and was heated using circulating hot water. The samples were extruded using a Garvey die and extrusion rates and surface appearance are give in Table II. The 6"×6" plaques were pressed using a 2 minute preheat and 3 minute press at 350° F. and then submitted for physical testing. The results of this testing are given in Table II. The results in Table II illustrate that blends of an uncured acrylate elastomer, a curative for the elastomer, and a polyvinyl chloride/2-ethylhexyl acrylate copolymer which are cured while mixing will produce products with improved compression set resistance, oil resistance, lower hardness, reduced high temperature deformation and, depending on the acrylate elastomer chosen, improved low temperature flexibility.

EXAMPLE 4

Blends of the polyvinyl chloride/2-ethylhexyl acrylate copolymer described in Example 1 with an uncured acrylate elastomer (Polymer A) were prepared in the presence of a curing system for the elastomer using a laboratory Banbury (BR size) mixer. Filler levels and types were varied in order to determine the effect on extrudate smoothness. The mixtures were compounded in the Banbury in the presence of stabilizers and an antioxidant and then dropped from the Banbury at stock temperatures of 299° to 352° F. The mixture was then placed on a 6"×16" unheated mill and formed into a sheet. The milled sheet was cut into both 1" wide strips and 6"×6" plaques. The 1" wide strips were extruded on an extruder designed for processing elastomeric materials as described in Example 2. The extrudates were rated for surface appearance and the extrusion rate was recorded. The 6"×6" plaques were compression molded using a 2 minute preheat and 3 minute press at 356° F. and then submitted for physical testing. The results of this testing are given in Table II.

This example illustrates that the proper choice of filler can significantly improve extruded part surface appearance while maintaining good compression set properties and oil resistance. The oil resistance was measured by ASTM D-471.

| CODE | |
| --- | --- |
| POLYMER A | ethyl, butyl and methoxyethyl acrylates ⅓ each - plus chlorine and carboxyl containing reactive cure monomers |
| POLYMER B | ethyl acrylate - plus chlorine and carboxyl containing reactive cure monomers |
| POLYMER C | copolymer of butyl acrylate and ethyl acrylate (80/20) - plus chlorine and carboxyl containing reactive cure monomers |

TABLE I[1]

| | | | | | |
| --- | --- | --- | --- | --- | --- |
| PVC/2-ethylhexyl acrylate copolymer | 100 | 100 | 100 | 100 | 100 |
| Ground Acrylate Elastomer (Polymer A) | 0 | 20 | 50 | 100 | 200 |
| Banbury Time (min.) | 5.5 | 4.2 | 3.2 | 3.9 | 3.2 |
| Banbury Drop Temp. (°F.) | 304 | 300 | 302 | 302 | 310 |
| Extrusion Stock Temp. (°F.) | 193 | 214 | 221 | 216 | 214 |
| Extrusion Rate (g/min) | 220 | 234 | 206 | 226 | 224 |
| Extrusion Surface Appearance | small bumps/ sticky | smooth | smooth | smooth | smooth |
| Compression Set (100° C./22 hrs) ASTM D-395 Method B | 67 | 50 | 44 | 28 | 18 |
| Oil Resistance (100° C./166 hrs) ASTM #3 Oil - % Volume Swell | 205 | 152 | 136 | 96 | 66 |
| Hardness - Shore A | 56 | 54 | 48 | 43 | 38 |
| Deformation % - 121° C./1 hour 2000 g. Load | 73 | 58 | 59 | 55 | 45 |
| Clash-Berg Stiffness, psi Modulus of Rigidity at −35° C. | 50,900 | 43,900 | 35,900 | 25,200 | 19,800 |

[1]Compound also contains stabilizer 5, costabilizer 3, filler 8 and antioxidant 0.5

TABLE II[1]

| | | | | | | | | | | | | | |
| --- | --- | --- | --- | --- | --- | --- | --- | --- | --- | --- | --- | --- | --- |
| PVC/2-ethylhexyl acrylate | 100[2] | 100 | 100 | 100 | 100 | 100 | 100 | 100 | 100 | 100 | 100 | 100 | 100 |
| Polymer A | — | 20 | — | — | 40 | — | — | 60 | — | — | 100 | — | — |
| Polymer B | — | — | 20 | — | — | 40 | — | — | 60 | — | — | 100 | — |
| Polymer C | — | — | — | 20 | — | — | 40 | — | — | 60 | — | — | 100 |
| Cetyl Trimethyl Ammonium Bromide | — | 0.2 | 0.2 | 0.2 | 0.4 | 0.4 | 0.4 | 0.6 | 0.6 | 0.6 | 1.0 | 1.0 | 1.0 |

TABLE II[1]-continued

| | | | | | | | | | | | | | |
|---|---|---|---|---|---|---|---|---|---|---|---|---|---|
| Sodium Stearate | — | 0.8 | 0.8 | 0.8 | 1.6 | 1.6 | 1.6 | 2.4 | 2.4 | 2.4 | 4.0 | 4.0 | 4.0 |
| Banbury Time (min.) | 5.5 | 5.2 | 3.5 | 5 | 3.8 | 4.3 | 4 | 3.8 | 3.3 | 4.4 | 4 | 3.8 | 3.5 |
| Banbury Drop Temp. (°F.) | 304 | 308 | 311 | 299 | 311 | 363 | 316 | 325 | 323 | 331 | 308 | 320 | 315 |
| Extrusion Stock Temp. (°F.) | 193 | 220 | 218 | 218 | 220 | 220 | 218 | 218 | 221 | 221 | 220 | 221 | 220 |
| Extrusion Rate (g/min.) | 220 | 224 | 230 | 208 | 208 | 220 | 188 | 196 | 218 | 206 | 196 | 214 | 156 |
| Extrusion Appearance | small bumps/sticky | nervy | slightly nervy | very nervy | Very Nervy | Nervy | Extremely Nervy | Very Nervy | Nervy | Very Nervy | Very Nervy | Nervy | Extremely Nervy |
| Compression set (100° C.22 hrs.) ASTM D-395 Method B | 67 | 48 | 44 | 53 | 34 | 48 | 32 | 29 | 19 | 29 | 23 | 18 | 17 |
| Oil Resistance (100° C./166 hrs.) ASTM #3 Oil - % Volume Swell | 205 | 142 | 140 | 161 | 111 | 119 | 127 | 99 | 91 | 116 | 83 | 73 | 101 |
| Hardness - Shore A | 56 | 53 | 54 | 45 | 42 | 52 | 38 | 40 | 48 | 38 | 35 | 45 | 35 |
| Deformation % - 121° C.1 hr. 2000 g. Load | 73 | 64 | 55 | 66 | 53 | 55 | 56 | 57 | 46 | 54 | 49 | 37 | 39 |
| Clash-Berg Stiffness, psi Modulus of Rigidity at −35° C. | 50,900 | 51,900 | 61,900 | 35,100 | 33,700 | 55,000 | 27,400 | 32,300 | 64,600 | 23,900 | 22,000 | 68,500 | 3200 |

[1] Compound also contains stabilizer 5, co-stabilizer 3, filler 8 and antioxidant 0.5
[2] Control from Example #2 - pressed at 320° F.

TABLE III[1]

| | | | | | | | | | |
|---|---|---|---|---|---|---|---|---|---|
| PVC/2-ethylhexyl acrylate | 100[2] | 100 | 100 | 100 | 100 | 100 | 100 | 100 | 100 |
| Polymer A | — | 60 | 60 | 60 | 60 | 60 | 60 | 60 | 60 |
| Cetyl Trimethyl Ammonium Bromide | — | 0.6 | 0.6 | 0.6 | 0.6 | 0.6 | 0.6 | 0.6 | 0.6 |
| Sodium Stearate | — | 2.4 | 2.4 | 2.4 | 2.4 | 2.4 | 2.4 | 2.4 | 2.4 |
| Calcium Carbonate −3.5 u uncoated | 8 | 8 | 50 | 100 | 8 | 8 | 8 | 8 | 8 |
| Carbon Black N-110 | — | — | — | — | 20 | 50 | — | — | 100 |
| Carbon Black N-990 | — | — | — | — | — | — | 50 | 100 | — |
| Banbury Time (min.) | 5.5 | 3.8 | 4 | 4.5 | 3.8 | 4.3 | 4.3 | 4 | 3 |
| Banbury Drop Temp. (°F.) | 304 | 318 | 310 | 317 | 310 | 324 | 318 | 320 | 352 |
| Extrusion Stock Temp. (°F.) | 193 | 217 | 217 | 220 | 221 | 220 | 223 | 220 | — |
| Extrusion Rate (g/min.) | 220 | 208 | 274 | 294 | 234 | 218 | 230 | 250 | — |
| Extrusion Appearance | Small Bumps/Sticky | Very Nervy | Very Nervy | Slight Roughness | Rough Nervy | Smooth | Very Rough | Very Smooth | Smooth |
| Compression Set (100° C./22 hrs.) ASTM D-395 Method B | 67 | 39 | 17 | 20 | 28 | 59 | 45 | 34 | 83 |
| Oil Resistance (100° C./166 hrs.) ASTM #3 Oil - % Volume Swell | 205 | 82 | 79 | 74 | 82 | 71 | 75 | 69 | 52 |
| Hardness - Shore A | 56 | 42 | 43 | 51 | 57 | 76 | 50 | 67 | 94 |
| Deformation % - 121° C./1 hr. 2000 g. Load | 73 | 54 | 56 | 43 | 40 | 24 | 39 | 33 | 11 |
| Clash-Berg Stiffness, psi Modulus of Rigidity at −35° C. | 50,900 | 29,000 | 33,900 | 52,800 | 41,100 | 63,500 | 52,400 | 87,900 | 111,400 |

[1] Compound also contains stabilizer 5, co-stabilizer 3, filler 8 and antioxidant 0.5
[2] Control from Example #2 - pressed at 320° F.

While in accordance with the Patent Statutes, the best mode and preferred embodiment has been set forth, the scope of the invention is not limited thereto, but rather by the scope of the attached claims.

What is claimed is:

1. A process for blending a polyvinyl chloride-acrylate copolymer with an acrylate elastomer, comprising the steps of:

mixing a polyvinyl chloride-acrylate copolymer with a cured acrylate elastomer, said polyvinyl chloride-acrylate copolymer containing (a) about 10 parts to about 90 parts by weight of vinyl chloride units and optional vinyl component units wherein the amount of said optional vinyl component units is from about 0 to about 45 parts by weight and from (b) about 90 parts to about 10 parts by weight of one or more acrylate units, said acrylate units, before polymerization, having the formula

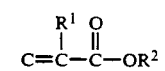

FORMULA I wherein $R^1$ is an aromatic, an aliphatic, or combinations thereof, having from 1 to 18 carbon atoms, or a halogen derivative thereof, or hydrogen, and wherein $R^2$ is an aliphatic, an aromatic, an alkyl hydroxyl, or combinations thereof having from 1 to 18 carbon atoms, or a halogen derivative thereof; or a hydrocarbyl ether including an alkoxyalkyl, a phenoxyaryl, a phenoxyalkyl, or combinations thereof, having from 2 to 1,000 carbon atoms, or a substituted halogen, oxygen, sulfur, or nitrogen derivative thereof, and from about 1 part to about 400 parts by weight of a cured acrylate elastomer for every 100 parts by weight of said polyvinyl chloride-acrylate copolymer, said acrylate elastomer made by polymerizing one or more monomers having the formula

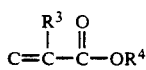
FORMULA II wherein $R^3$ is an aromatic, an aliphatic, or combinations thereof, having from 1 to 18 carbon atoms, or a halogen derivative thereof, or hydrogen, and wherein $R^4$ is an aliphatic, an aromatic, an alkyl hydroxyl, or combinations thereof, having from 1 to 18 carbon atoms, or a halogen derivative thereof; or a hydrocarbyl ether such as an alkoxyalkyl, phenoxyaryl, phenoxyalkyl, or combinations thereof, having from 2 to 1,000 carbon atoms, or a substituted halogen, oxygen, sulfur, or nitrogen derivative thereof, and carrying out said mixing at a temperature of from about 20° C. to about 230° C.

2. A process for blending a polyvinyl chloride-acrylate copolymer with an acrylate elastomer, comprising the steps of:

mixing and curing an acrylate elastomer with a polyvinyl chloride-acrylate copolymer, said polyvinyl chloride-acrylate copolymer containing from (a) about 10 parts to about 90 parts by weight of vinyl chloride units and optional vinyl component units wherein the amount of said optional vinyl component units is from about 0 to about 45 parts by weight and from (b) about 90 parts to about 10 parts by weight of one or more acrylate units, said acrylate units, before polymerization, having the formula

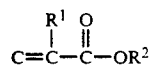
FORMULA I wherein $R^1$ is an aromatic, an aliphatic, or combinations thereof, having from 1 to 18 carbon atoms, or a halogen derivative thereof, or hydrogen, and wherein $R^2$ is an aliphatic, an aromatic, an alkyl hydroxyl, or combinations thereof having from 1 to 18 carbon atoms, or a halogen derivative thereof; or a hydrocarbyl ether including an alkoxyalkyl, a phenoxyaryl, a phenoxyalkyl, or combinations thereof, having from 2 to 1,000 carbon atoms, or a substituted halogen, oxygen, sulfur, or nitrogen derivative thereof, and from about 1 part to about 400 parts by weight of an acrylate elastomer for every 100 parts by weight of said polyvinyl chloride-acrylate copolymer, said acrylate elastomer made by polymerizing one or more monomers having the formula

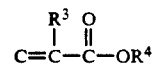
FORMULA II wherein $R^3$ is an aromatic, an aliphatic, or combinations thereof, having from 1 to 18 carbon atoms, or a halogen derivative thereof, or hydrogen, and wherein $R^4$ is an aliphatic, an aromatic, an alkyl hydroxyl, or combinations thereof, having from 1 to 18 carbon atoms, or a halogen derivative thereof; or a hydrocarbyl ether such as an alkoxyalkyl, phenoxyaryl, phenoxyalkyl, or combinations thereof, having from 2 to 1,000 carbon atoms, or a substituted halogen, oxygen, sulfur, or nitrogen derivative thereof, and carrying out said mixing and curing at a temperature of from about 85° C. to about 230° C.

3. A process for blending a polyvinyl chloride-acrylate copolymer with an acrylate elastomer, comprising the steps of:

mixing a polyvinyl chloride-acrylate copolymer and an uncured acrylate elastomer, said polyvinyl chloride-acrylate copolymer containing from (a) about 10 parts to about 90 parts by weight of vinyl chloride units and optional vinyl component units wherein the amount of said optional vinyl component units is from about 0 to about 45 parts by weight and from (b) about 90 parts to about 10 parts by weight of one or more acrylate monomers, said acrylate monomers having the formula

FORMULA I wherein $R^1$ is an aromatic, an aliphatic, or combinations thereof, having from 1 to 18 carbon atoms, or a halogen derivative thereof, or hydrogen, and wherein $R^2$ is an aliphatic, an aromatic, an alkyl hydroxyl, or combinations thereof having from 1 to 18 carbon atoms, or a halogen derivative thereof; or a hydrocarbyl ether including an alkoxyalkyl, a phenoxyaryl, a phenoxyalkyl, or combinations thereof, having from 2 to 1,000 carbon atoms, or a substituted halogen, oxygen, sulfur, or nitrogen derivative thereof, and from 1 part to about 400 parts by weight of an acrylate elastomer for every 100 parts by weight of said polyvinyl chloride-acrylate copolymer, said acrylate elastomer made by polymerizing one or more monomers having the formula

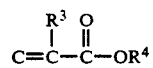
FORMULA II wherein $R^3$ is an aromatic, an aliphatic, or combinations thereof, having from 1 to 18 carbon atoms, or a halogen derivative thereof, or hydrogen, and wherein $R^4$ is an aliphatic, an aromatic, an alkyl hydroxyl, or combinations thereof, having from 1 to 18 carbon atoms, or a halogen derivative thereof; or a hydrocarbyl ether such as an alkoxyalkyl, phenoxyaryl, phenoxyalkyl, or combinations thereof, having from 2 to 1,000 carbon atoms, or a substituted halogen, oxygen, sulfur, or nitrogen derivative thereof, and subsequently curing said uncured acrylate elastomer at a temperature of from about 85° C. to about 230° C.

* * * * *